(12) United States Patent
Baker et al.

(10) Patent No.: US 7,470,016 B2
(45) Date of Patent: Dec. 30, 2008

(54) INTRODUCING MATERIAL INTO A PRINTHEAD ENCLOSURE

(75) Inventors: Richard Baker, West Lebanon, NH (US); Edward R. Moynihan, Plainfield, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 0 days.

(21) Appl. No.: 11/292,548

(22) Filed: Dec. 2, 2005

(65) Prior Publication Data

US 2006/0132571 A1     Jun. 22, 2006

Related U.S. Application Data

(60) Provisional application No. 60/633,240, filed on Dec. 3, 2004.

(51) Int. Cl.
C09D 11/00 (2006.01)
(52) U.S. Cl. .................. 347/100; 347/21; 347/22; 347/28
(58) Field of Classification Search .......... 347/84, 347/85, 29, 34, 100, 21, 22, 28
See application file for complete search history.

(56) References Cited

U.S. PATENT DOCUMENTS

| | | | |
|---|---|---|---|
| 5,265,315 A | 11/1993 | Hoisington et al. | |
| 5,371,531 A | 12/1994 | Rezanka et al. | |
| 6,578,945 B2 | 6/2003 | Hashi et al. | |
| 6,695,429 B2 | 2/2004 | Barinaga | |
| 6,962,411 B2 * | 11/2005 | West et al. | 347/90 |
| 2002/0044185 A1 * | 4/2002 | Koitabashi et al. | 347/98 |
| 2002/0080216 A1 * | 6/2002 | Dowell et al. | 347/85 |
| 2002/0126174 A1 | 9/2002 | Sharma et al. | |
| 2002/0140761 A1 * | 10/2002 | Tsurui | 347/25 |
| 2002/0180854 A1 * | 12/2002 | Sato et al. | 347/96 |
| 2003/0084816 A1 * | 5/2003 | Leu et al. | 106/31.27 |
| 2003/0160846 A1 * | 8/2003 | Yoshida et al. | 347/85 |
| 2003/0196571 A1 * | 10/2003 | Hakiri et al. | 106/31.65 |
| 2004/0189744 A1 * | 9/2004 | Myhill et al. | 347/34 |
| 2005/0237370 A1 * | 10/2005 | Elgee et al. | 347/102 |
| 2006/0274116 A1 * | 12/2006 | Wu | 347/45 |

FOREIGN PATENT DOCUMENTS

JP     2005178251 A  *  7/2005

OTHER PUBLICATIONS

U.S. Appl. No. 10/189,947, filed Jul. 3, 2002 Bibl et al.
International Search Report, Patent Cooperation Treaty, May 3, 2007.
U.S. Appl. No. 11/043,841, Moynihan, Filed Jan. 25, 2005; Copies of Application, Pending Claims, and PAIR Transaction History.
U.S. Appl. No. 60/633,240, Baker et al., Filed Dec. 3, 2004; Copies of Appl. Claims, and PAIR Transaction History.

* cited by examiner

*Primary Examiner*—Manish S Shah
*Assistant Examiner*—Laura E Martin
(74) *Attorney, Agent, or Firm*—Fish & Richardson P.C.

(57) ABSTRACT

A printing apparatus includes a jetting assembly including a plurality of nozzles for ejecting droplets on a substrate; an enclosure defining a print zone within which the jetting assembly prints on the substrate, the enclosure including an inlet for introducing a material associated with controlling an environment of the enclosure.

24 Claims, 1 Drawing Sheet

INTRODUCING MATERIAL INTO A PRINTHEAD ENCLOSURE

CROSS-REFERENCE TO RELATED APPLICATIONS

Under 35 U.S.C. §119(e)(1), this application claims benefit of Provisional Patent Application No. 60/633,240, entitled "PRINTHEADS AND SYSTEMS USING PRINTHEADS," filed on Dec. 3, 2004, the entire contents of which are incorporated herein by reference.

TECHNICAL FIELD

This invention relates to printheads and systems using printheads.

BACKGROUND

Ink jet printers typically include an ink path from an ink supply to a nozzle path. The nozzle path terminates in a nozzle opening from which ink drops are ejected. Ink drop ejection is controlled by pressurizing ink in the ink path with an actuator, which may be, for example, a piezoelectric deflector, a thermal bubble jet generator, or an electro statically deflected element. A typical printhead includes a reservoir and a jetting assembly. The jetting assembly has an array of ink paths with corresponding nozzle openings and associated actuators, and drop ejection from each nozzle opening can be independently controlled. In a drop-on-demand printhead, each actuator is fired to selectively eject a drop at a specific pixel location of an image as the jetting assembly and a printing substrate are moved relative to one another. In high performance jetting assemblies, the nozzle openings typically have a diameter of 50 microns or less, e.g. around 25 microns, are separated at a pitch of 100-300 nozzles/inch, have a resolution of 100 to 3000 dpi or more, and provide drop sizes of about 1 to 70 picoliters (pl) or less. Drop ejection frequency is typically 10 kHz or more.

Hoisington et al. U.S. Pat. No. 5,265,315, the entire contents of which is hereby incorporated by reference, describes a jetting assembly having a semiconductor body and a piezoelectric actuator. The assembly body is made of silicon, which is etched to define ink chambers. Nozzle openings are defined by a separate nozzle plate, which is attached to the silicon body. The piezoelectric actuator has a layer of piezoelectric material, which changes geometry, or bends, in response to an applied voltage. The bending of the piezoelectric layer pressurizes ink in a pumping chamber located along the ink path.

Further examples of jetting assemblies are disclosed in U.S. patent application Ser. No. 10/189,947, entitled "PRINTHEAD," to Andreas Bibl et al., filed on Jul. 3, 2002, the entire contents of which are hereby incorporated by reference.

The amount of bending that a piezoelectric material exhibits for a given voltage is inversely proportional to the thickness of the material. As a result, as the thickness of the piezoelectric layer increases, the voltage requirement increases. To limit the voltage requirement for a given drop size, the deflecting wall area of the piezoelectric material may be increased. The large piezoelectric wall area may also require a correspondingly large pumping chamber, which can complicate design aspects such as maintenance of small orifice spacing for high-resolution printing.

In general, printheads can include one or more jetting assemblies. Printing systems can print in a single pass of the substrate relative to the printhead, or in multiple passes. Printheads can be used to jet inks and/or other fluids, such as materials used for electronic components (e.g., electrically conductive materials) or color filter materials for flat panel displays, for example.

SUMMARY

In a general aspect of the invention, a printing apparatus comprises a jetting assembly including a plurality of nozzles for ejecting droplets on a substrate; an enclosure defining a print zone within which the jetting assembly prints on the substrate, the enclosure including an inlet for introducing a material associated with controlling an environment of the enclosure.

Embodiments of this aspect of the invention may include one or more of the following features.

The material is vaporized water, dry air, alcohol, MEK, or a sanitizing agent. The dry air has a pre-determined temperature. The material is adapted to suppress bacterial growth. The material is compatible with the droplets. The printing apparatus further comprises a sensor placed within the enclosure. The sensor is configured to provide a signal that is used to regulate the environment within the enclosure. The enclosure includes an outlet.

In another general aspect of the invention, a method of printing comprises providing an enclosure defining a print zone, the enclosure including an inlet for introducing a material associated with controlling an environment of the enclosure; positioning a jetting assembly including a plurality of nozzles for ejecting droplets on a substrate within the print zone; and introducing a material associated with controlling the environment of the enclosure through the inlet.

Embodiments of this aspect of the invention may include one or more of the following features.

The material is vaporized water, dry air, alcohol, MEK, or a sanitizing agent. The dry air has a pre-determined temperature. The material is adapted to suppress bacterial growth. The material is selected based on the characteristics of the droplets. The method of printing further comprises placing a sensor within the enclosure. The method of printing further comprises configuring the sensor to provide a signal that is used to regulate the environment of the enclosure. The enclosure includes an outlet.

Among other advantages, the enclosure defines a conditioning print zone in which an environment favorable to the print head nozzles is maintained. For example, the humidity of the print zone can be maintained at a level that minimizes the possibility of the nozzles becoming dry or, alternatively, causing condensation to form on the nozzles. Depending on the characteristics of the ink, other materials (e.g., alcohol, MEK) may be introduced into the enclosure. Thus, the reliability of the print head nozzles is maintained and the need for servicing and replacement is reduced.

Gaseous materials including hydrogen and nitrogen can also be introduced into the conditioning print zone. Where solvents or hazardous chemicals are used, the enclosure provides operator health and safety benefits.

Sanitizing agents or other materials to suppress bacterial growth can also be introduced, particularly useful in applications associated with printing on food products. The sanitizing agent is used to maintain a sanitary environment so as not to contaminate products including food or pharmaceuticals.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
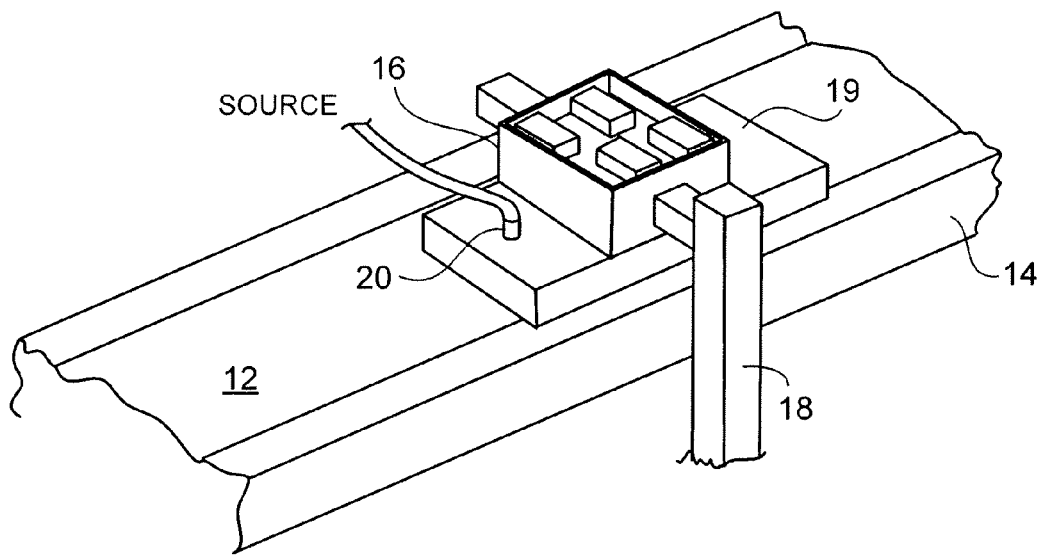
FIG. 1 is a perspective view of a printing assembly including a controlled environment enclosure.
Figure 2:
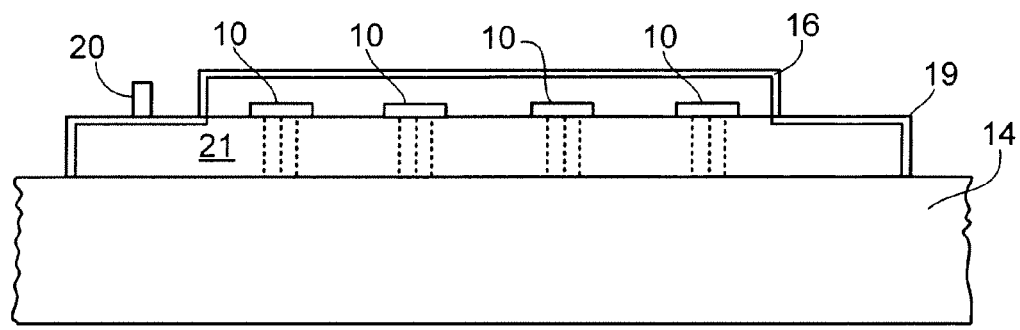
FIG. 2 is a cross-sectional side view of the printing assembly and controlled environment enclosure of FIG. 1.

Referring to FIGS. 1 and 2, four print head clusters 10 used as part of a production process in which a substrate 12 is moved by a conveyor 14 beneath the print head clusters. In this embodiment, conveyor 14 supports substrates as wide as one to four feet and is capable of moving at speeds as high as 1600 feet/minute. Each of print head clusters 10 include an array of jetting assemblies, each of which is connected to one or more ink reservoirs. Print head clusters 10 print text or images upon the substrate as it passes beneath the print head clusters. Print head clusters 10 are supported by and movable on one end of a mounting rack 16 positioned over conveyor 14 and attached to a support post 18.

An enclosure 19 is positioned between print head clusters 10 and just above the surface of conveyor 14 to define a conditioning print zone 21. The conditioning print zone provides an environment favorable to the nozzles of the print head clusters such that their reliability is improved. Enclosure 19 includes an inlet 20 connected to a source of material to be introduced in the enclosure.

For example, in one embodiment, the source of material is vaporized water for providing a desirable level of humidity in the print zone. Providing an environment with greater humidity can extend time for the deposited ink to dry and also prevent the nozzles from becoming dry. When a nozzle has not jetted ink for a substantial amount of time there is a risk that ink will dry and eventually the nozzle will become clogged. A humid environment addresses this problem and can improve the "nozzle open time." The level of humidity is generally selected based on the type of water-based ink. In contrast to providing humidity, the source of material may be a current of dry air (heated or cooled) passed in front of the print head nozzles to minimize the possibility of condensation forming on the nozzles of the print head clusters. For other types of inks, different materials may be introduced into enclosure 19 through inlet 20. For example, the source of material introduced into enclosure 19 may be alcohol or MEK. Thus, the reliability of the print head nozzles is maintained and the need for servicing and replacement is reduced.

In still other embodiments, sanitizing agents or other materials to suppress bacterial growth can also be introduced, particularly useful in applications associated with printing on food products or pharmaceuticals.

In certain embodiments, a sensor (not shown) can be placed within enclosure 19 to measure conditions within the conditioning print zone. The sensor provides a signal that is used to regulate the environment within enclosure 19 by either increasing/decreasing material being introduced. Thus, a closed loop control system is provided.

In certain embodiments, the source material is selected to be compatible with the characteristics of the ink; e.g., selecting a source material to be soluble in the selected ink, or selecting a source material which chemically reacts with the selected ink in a desired manner appropriate to the particular printing application.

A number of embodiments of the invention have been described. Nevertheless, it will be understood that various modifications may be made without departing from the spirit and scope of the invention. For example, although four print head clusters were shown supported on mounting rack 16, in other embodiments, fewer or greater numbers of print head clusters can be positioned on mounting rack 16. Enclosure 19 can also include additional inlets as well as outlets for controlling the environment in the conditioning print zone.

Accordingly, other embodiments are within the scope of the following claims.

What is claimed is:

1. An apparatus comprising:
    a jetting assembly including a plurality of nozzles for ejecting droplets of a droplet material on a substrate;
    an enclosed print zone within which the jetting assembly prints on the substrate, the enclosed print zone having an inlet formed in a wall of the enclosed print zone, the inlet being different from the plurality of nozzles; and
    a mechanism for introducing through the inlet into the enclosed print zone a vaporized environmental material different from the droplet material associated with controlling an environment of the print zone.

2. The apparatus of claim 1, wherein the environmental material comprises water.

3. The apparatus of claim 1, wherein the environmental material comprises alcohol.

4. The apparatus of claim 1, wherein the environmental material comprises MEK.

5. The apparatus of claim 1, wherein the environmental material comprises a sanitizing agent.

6. The apparatus of claim 1, wherein the environmental material is adapted to suppress bacterial growth.

7. The apparatus of claim 1, wherein the vaporized environmental material is soluble in the droplet material.

8. The apparatus of claim 1, further comprising a sensor placed within the enclosure.

9. The apparatus of claim 8, wherein the sensor is configured to provide a signal that is used to regulate the environment within the print zone.

10. The apparatus of claim 1, further comprising a mechanism for removing the environmental material associated with controlling the environment of the print zone.

11. A method of printing comprising:
    introducing a vaporized environmental material to an enclosed print zone through an inlet formed in a wall of the enclosed print zone, and
    jetting droplets of a droplet material on a substrate from a nozzle within the print zone while the vaporized environmental material is present and in a vicinity of the nozzle to prevent the droplet material from drying in the nozzle.

12. The method of claim 11 wherein the environmental material comprises water.

13. The method of claim 11 wherein the environmental material comprises alcohol.

14. The method of claim 11 wherein the environmental material comprises MEK.

15. The method of claim 11 wherein the environmental material comprises a sanitizing agent.

16. The method of claim 11 wherein the environmental material is adapted to suppress bacterial growth.

17. The method of claim 11 further comprising selecting the environmental material to be soluble in the droplet material.

18. The method of claim 11, further comprising placing a sensor within the enclosed print zone.

19. The method of claim 18, further comprising configuring the sensor to provide a signal that is used to regulate an environment within the print zone.

20. The method of claim 11, further comprising removing the environmental material from the print zone.

21. An apparatus comprising:

a jetting assembly including a plurality of nozzles to eject droplets of a droplet material to print on a substrate within an enclosed print zone, an inlet formed in a wall of the enclosed print zone different from the plurality of nozzles, and a mechanism to control an environment within the print zone by introducing a vaporized environmental material, different from the droplet material, through the inlet and into the print zone while the droplets are ejected.

22. The apparatus of claim 21, wherein the vaporized environmental material is soluble in the droplet material.

23. The apparatus of claim 21, further comprising a sensor placed within the enclosed print zone.

24. The apparatus of claim 21, further comprising a mechanism for removing the environmental material associated with controlling the environment of the print zone.

* * * * *